United States Patent
Dyer et al.

(10) Patent No.: US 6,250,894 B1
(45) Date of Patent: Jun. 26, 2001

(54) LOAD SHARING VALVE AND SYSTEM FOR OPERATING CENTRIFUGAL PUMPS IN PARALLEL

(75) Inventors: Gerald P. Dyer, Enfield; Charles E. Reuter, Granby, both of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/287,829

(22) Filed: Apr. 7, 1999

(51) Int. Cl.$^7$ ....................................................... F04B 49/00
(52) U.S. Cl. ......................... 417/279; 417/302; 417/286; 137/114; 60/430
(58) Field of Search ............................. 137/565.33, 113, 137/114; 417/279, 302, 426, 286; 60/430

(56) References Cited

U.S. PATENT DOCUMENTS

| | | | |
|---|---|---|---|
| 2,312,686 | * 3/1943 | Campbell | 137/114 |
| 2,835,323 | 5/1958 | Booth . | |
| 3,442,218 | 5/1969 | Wess . | |
| 3,540,218 | * 11/1970 | Finn, Jr. | 60/430 |
| 3,952,510 | * 4/1976 | Peterson | 60/430 |
| 4,378,675 | * 4/1983 | Otto | 137/565.33 |
| 4,478,043 | * 10/1984 | Kobavashi et al. | 417/286 |
| 5,829,252 | * 11/1998 | Hirata et al. | 60/430 |

FOREIGN PATENT DOCUMENTS

| | | |
|---|---|---|
| 657651 | 6/1995 | (EP) . |
| 1546337 | 5/1979 | (GB) . |

\* cited by examiner

*Primary Examiner*—Cheryl J. Tyler

(57) ABSTRACT

A system allows pumps to run in parallel and preventing back flow through a non-operational pump. The system includes a first pump in parallel with a second pump. The system further includes a check valve in fluid communication with the first pump for preventing flow through the first pump when the first pump is not operating. The system further includes a sensing valve in fluid communication with the first pump and the second pump. The system also includes a load sharing valve in fluid communication with the check valve, the sensing valve, and the second pump for controlling a system flow, wherein the system flow is provided by the first pump when the second pump is not operating, and wherein the system flow is provided by the second pump when the first pump is not operating, and wherein the system flow includes a portion of flow from both the first and second pumps when both pumps are operational.

11 Claims, 3 Drawing Sheets

LOAD SHARING VALVE AND SYSTEM FOR OPERATING CENTRIFUGAL PUMPS IN PARALLEL

TECHNICAL FIELD

This invention is directed to a system for operating centrifugal pumps in parallel and more particularly to a load sharing valve for operating centrifugal pumps in parallel.

BACKGROUND ART

In pumping applications, it is sometimes desirable to operate two centrifugal pumps in parallel. In the aircraft industry it is desirable for single engine aircraft where safety requirements demand that two fuel pumps operate in parallel so that if one pump fails, the other one will continue to supply fuel to the engine. Centrifugal pumps have characteristics that do not allow them to operate in parallel at low flows without additional means. Centrifugal pumps are capable of operating in parallel at higher flows. However, aircraft fuel pumps must operate over a wide range of flows and if they are simply hooked together, all of the demand at low flows will be supplied out of one pump while the other pump will be back flowed by the higher pressure of the other pump.

DISCLOSURE OF INVENTION

The primary object of this invention is to provide an improved system that allows for operation of centrifugal pumps in parallel over a wide range of flows.

Another object of this invention is to provide a load sharing valve that allows for simultaneous operation of centrifugal pumps in parallel at low flows.

A further object of the subject invention is to provide a system that allows for simultaneous operation of pumps in parallel and prevents back flow through a parallel pump that ceases to operate.

The objects and advantages set forth herein are achieved by the system of the present invention for allowing for the operation of centrifugal pumps in parallel. The system comprises two centrifugal pumps arranged in parallel. A check valve is disposed in the outlet line of a first centrifugal pump and closes to prevent back flow through the first pump in the event that the first pump is not operational.

A flow sensing valve is disposed in the outlet of the first pump and second pump. If both pumps are providing flow the sensing valve remains in a closed position. If there is no flow from the second pump the sensing valve opens porting fluid from the first pump to a bypass portion of a load sharing valve.

The load sharing valve has three input ports, a first pump input port for receiving flow from the first pump, a second pump input port for receiving flow from the second pump, and a bypass input port for receiving an input from the sensing valve. The load sharing valve also has two output ports which are manifolded together to form a common or system output.

The load sharing valve comprises a second pump spool located within the load sharing valve which is positioned as a function of the flow demanded by a fuel control or other device positioned downstream of the load sharing valve. The position of the second pump spool determines the area of the second pump window. The second pump spool also maintains a constant pressure differential across the second pump window.

The second pump spool also has a first and a second metering window disposed along the length thereof. The first metering window allows for flow from the first pump input port to enter an interior cavity of the second pump spool. The second metering window provides fluid communication between the interior cavity of the second pump spool and the first pump output port. In the preferred embodiment the area of the first metering window is equal to the area of the second pump window.

Disposed within the second pump spool is a first pump spool which acts as pressure regulating valve for maintaining a pressure differential across the first metering window. The pressure differential maintained by the first spool valve is equal to that maintained by the second pump spool valve. Since the area of and pressure differential across the first metering window are equal to those of the second pump window, each pump provides one half the total flow demanded by the downstream fuel control.

There are three basic operating modes for the load sharing valve and system. In the first mode both pumps are operable with the first pump providing flow to the first pump input port of the load sharing valve and the second pump providing flow to the second pump input port of the load sharing valve. The check valve is open and the sensing valve is closed therefore the first pump is providing flow at a pressure to the first pump input port of the load sharing valve and the second pump is providing flow at a pressure to the second pump input port.

The total flow is set by a downstream fuel control. The position of second pump spool of the load sharing valve is set in response to the flow demand. This in turn sets an equal flow area for the second pump window and the first metering window. Since the second pump spool and first pump spool set an equal pressure differential across the second pump window and the first metering window, the flow through each window is equal, because $Wf=\Delta P^{1/2} \times A \times Constant$. Therefore each pump provides half the total flow.

The first spool maintains the differential pressure across the first metering window by varying the area of the second metering window such that the pressure differential across the second metering window equals the pressure output from the first pump minus the pressure differential across the check valve, minus the pressure differential across the first metering window minus the pressure output from the second pump minus the pressure differential across the second pump window.

In a second mode, the first pump fails to provide any flow. The check valve will close to prevent back flow through the first pump and the 100% of the flow output from the load sharing valve will be from the second pump.

In a third mode, the second pump fails to provide any flow. The sensing valve opens placing the output of the first pump in fluid communication with the bypass input port of the load sharing valve. The second pump spool transitions to close the second pump input port and places the bypass input port in fluid communication with the second pump/bypass output port. Therefore 100% of the flow output from the load sharing valve comes from the first pump.

BEST MODE FOR CARRYING OUT THE INVENTION

Figure 1:
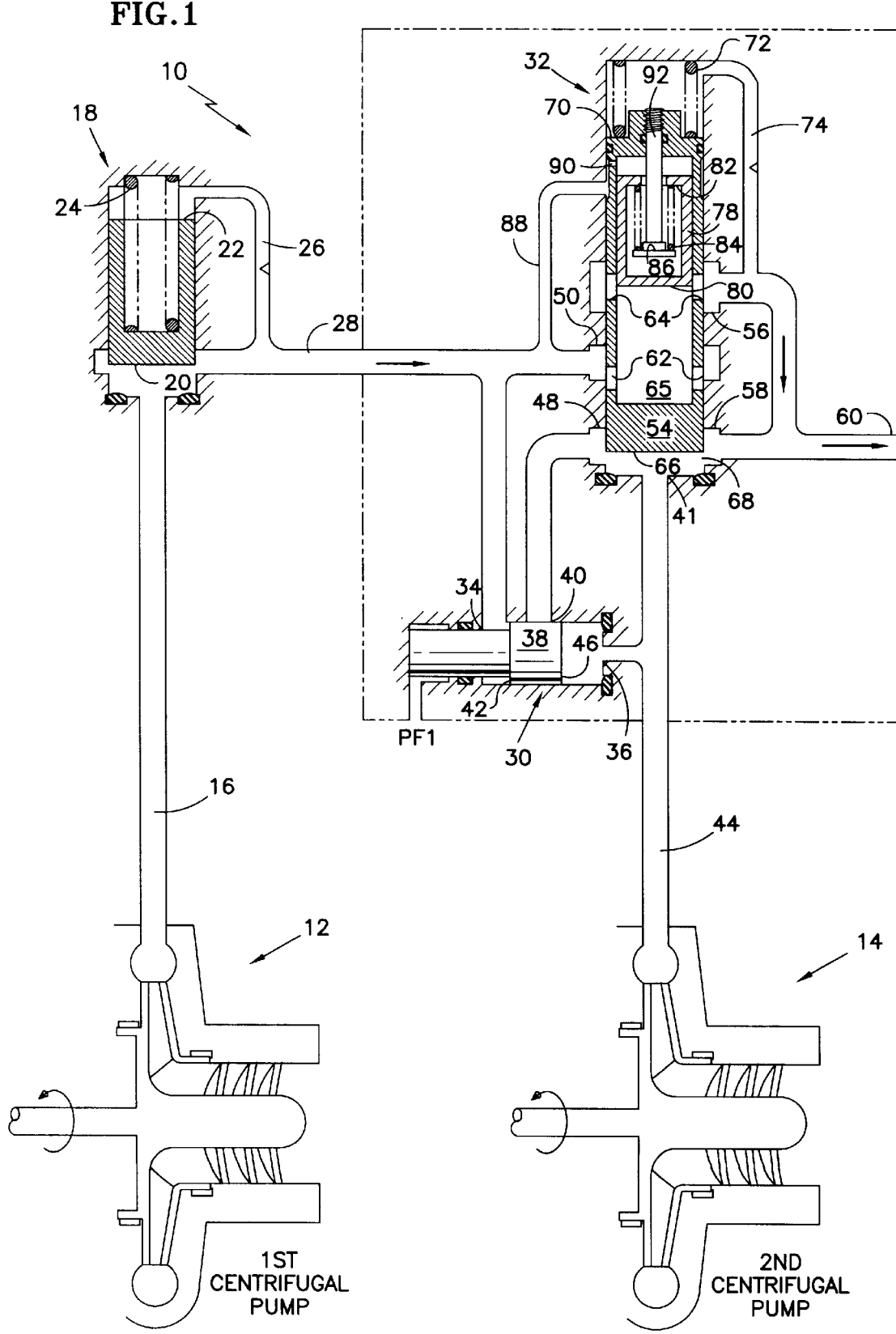
FIG. 1 is a schematic view of the load sharing system of the present invention, illustrating operation with both pumps supplying flow.

Referring now to the FIG. 1 in detail, there is shown a load sharing valve and system for operating centrifugal pumps in parallel, designated generally as 10. System 10 includes a first centrifugal pump 12 and a second centrifugal pump 14. The pressure of the output of first centrifugal pump 12 is greater than that of second centrifugal pump 14.

Check valve 18 has a first end 20 in fluid communication first pump outlet 16 and a second end 22 upon which spring 24 acts. Check valve 18 will open whenever first pump 12 provides sufficient pressure to overcome the force of spring 24. Therefore the pressure differential across check valve 18 is determined by spring 24.

Line 28 is in fluid communication with sensing valve 30 and load sharing valve 32. Sensing valve 30 includes a first pump input port 34, a second pump input port 36, a spool 38, and an output port 40. First input port 34 is in fluid communication with line 28 for providing first pump 12 output to a first end 42 of spool 38. Second pump input port 36 is in fluid communication with second pump outlet 44 for providing second pump 14 output to a second end 46 of spool 38.

The second end 46 has a larger area than first end 42 such that whenever the second pump 14 is providing flow, spool 38 will transition to the closed position, as shown, thus preventing fluid communication between first pump input port 34 and output port 40. Output port 40 is in fluid communication with bypass input port 48 of load sharing valve 32.

The load sharing valve 32 includes three input ports. A first pump input port 50, second pump input port 41, and bypass input port 48. First pump input port 50 is in fluid communication with line 28 while second pump input port 41 is in fluid communication with second pump outlet 44. Bypass input port 48 is in fluid communication with output port 40 of the sensing valve 30.

The load sharing valve also includes a first pump output port 56 and a second pump/bypass output port 58. The output ports 56 and 58 are in fluid communication with system output line 60.

Disposed within load sharing valve 32 is a second pump spool 54. Second pump spool 54 includes a first metering window 62 and a second metering window 64. First metering window 62 and second metering window 64 provide fluid communication to a cavity 65 of second pump spool 54. Second pump spool 54 further includes a first end 66, the position of which determines the area of second pump window 68. The position of second pump spool 54 also controls the area of first metering window 62. In the preferred embodiment the area of second pump window 68 and the area of first metering window 62 are equal. A second end 70 of second pump spool 54 serves as a seat for spring 72. Second end 70 is also in fluid communication with system output line 60 via line 74 for sensing system output pressure.

A first pump spool 78 is located within second pump spool 54. First pump spool 78 includes a first end 80 which is in fluid communication with cavity 65. The position of first spool 78 determines the area of the second pair of windows 64. A second end 82 of first pump spool 78 serves as spring seat for spring 84. In the preferred embodiment the spring constant of spring 84 is equal to that of spring 72. Spring 84 is seated at second end 86 at post 92 which is fixed to the second end 70 of second pump spool 54 for movement therewith. The second end 82 of first pump spool 78 is in fluid communication with line 28 via line 88 and passage 90. As stated above the first end 80 is in fluid communication with cavity 65. Therefore spring 84 holds the pressure drop across first metering window 62 constant by varying the area of the second metering window 64.

The operation of the system 10 and the load share valve 32 when both first pump 12 and second pump 14 are operating is as follows. The total flow at system output 60 is set by a downstream fuel control or other device capable of setting a flow rate (not shown).

Second pump 14 provides half the total flow (as will be further discussed herein) at a pressure on second pump outlet line 44. Second pump outlet line 44 is in fluid communication with second pump input port 36 of sensing valve 30 and second pump input port 41 of the load sharing valve 32.

First pump 12 provides half the total the flow at a pressure through first output line 16 to first end 20 of check valve 18 causing the check valve to open placing first pump output line 16 in fluid communication with line 28. Line 28 is in fluid communication with first pump input port 34 of the sensing valve 30 and first pump input port 50 of the load sharing valve 32.

The pressure of the fluid provided at second pump input port 36 acts on second end 46 of the sensing valve spool 38. The pressure of the fluid provided at the first input port 34 acts on the first end 42 of the sensing valve spool 38. As discussed above the area of second end 46 is greater than area of first end 42 such that when the second pump 14 is operational the sensing valve spool 38 will transition to the left preventing fluid communication between first input port 34 and output port 40. Therefore first pump 12 is not in fluid communication with bypass input port 48.

When second pump 14 is operational the pressure in second pump outlet 44 will cause second pump spool 54 to transition compressing spring 72 thus opening second pump window 68 and first metering window 62. This places second pump input port 41 in fluid communication with second pump/bypass output port 58 and places first pump input port 50 in fluid communication with cavity 65.

The pressure drop across second pump window 68 is determined by the spring 72. Therefore, the area of second pump window 68 and first metering window 62 is set in response to the total flow as set by the fuel control. The pressure of at the second pump output 44 is determined by the operating parameters of the second pump 14. The pressure of the flow at the system output 60 will be equal to the pressure at second pump output 44 minus the pressure drop across second pump window 68 as determined by spring 72.

The transitioning of second spool 54 also places first metering window 62 in fluid communication with first pump input port 50 and second metering window 64 in fluid communication with first pump output port 56. Therefore fluid communication is established between first pump 12 and system output line 60 via cavity 65.

As discussed above the area of and the pressure drop across first metering window 62 are equal to the area of and the pressure drop across second pump window 68. Therefore the flow through first metering window 62 and the flow through second pump window 68 are equal. The flow through second metering window 64 is also equal to the flow across first metering window 62. Therefore half the total flow is supplied by first pump 12 and half the total flow is supplied by second pump 12.

The area of the second metering window 64 is determined by the position of first pump spool 78 in response to the pressure in cavity 65 acting the first end 80 of first pump spool 78 and the first pump 12 output pressure which is equal to the first pump output pressure minus the pressure drop across the check valve, minus the pressure drop across the first metering window 62, minus the pressure at system output 60.

The contribution of first pump 12 and second pump 14 to the pressure at system output 60 can be varied by changing the relative areas of first metering window 62 and second pump window 68 and/or by varying the ratio of the spring constants for springs 72 and 84.

Figure 2:
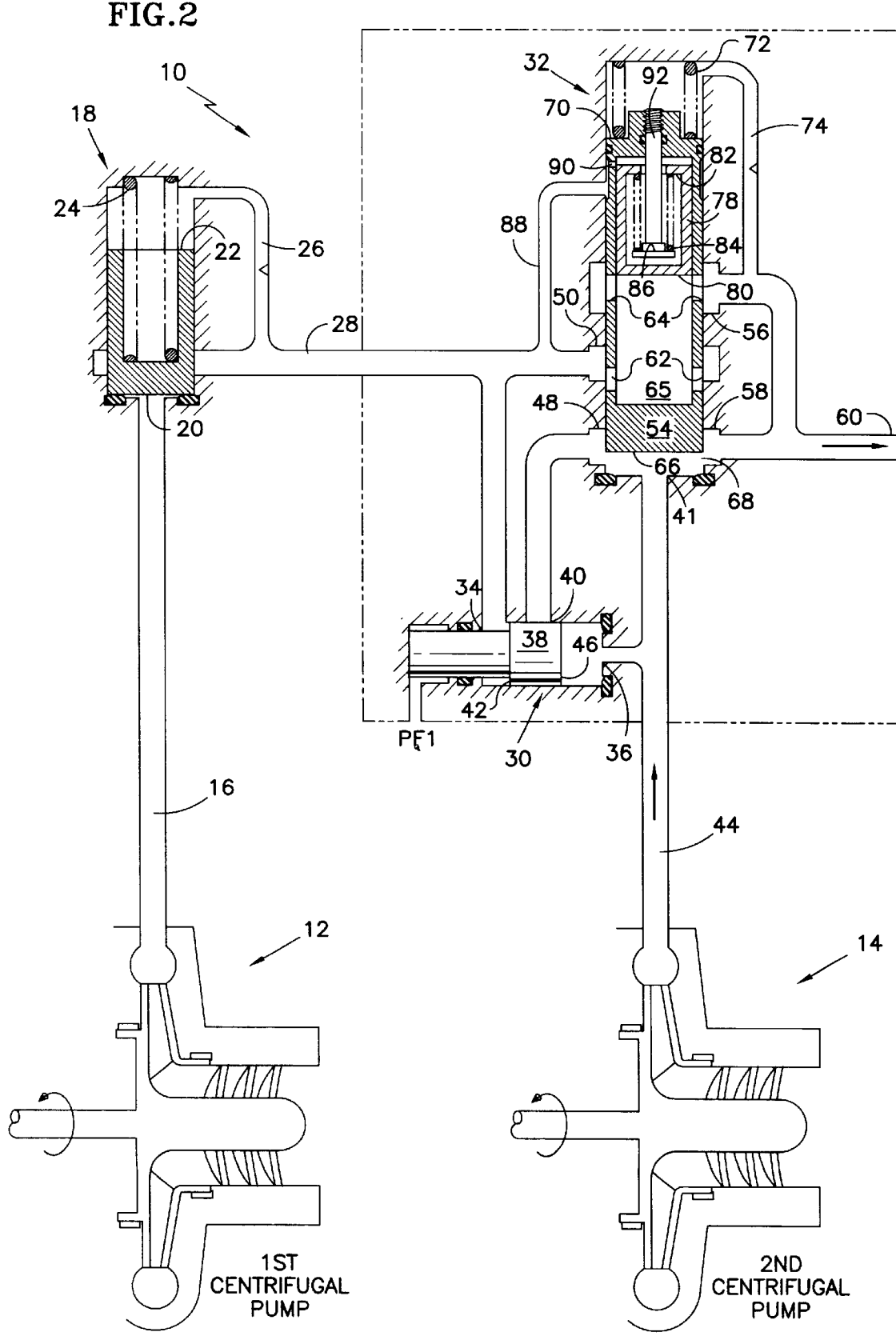
FIG. 2 is a schematic view of the load sharing system of the present invention illustrating operation with only the second pump supplying flow.

FIG. 2 illustrates operation of the system when only the second pump 14 is operational. First pump 12 provides insufficient pressure to overcome spring 24 of the check valve 18. Therefore there is no fluid communication between first pump outlet 16 and line 28.

Second pump 14 provides sufficient pressure at first end 66 of second pump spool 54 to compress spring 72 at second end 70 of the second pump spool 54 to open second pump window 68 placing second pump outlet 44 in fluid communication with system output line 60.

The pressure of system output line 60 is communicated to second end 70 of second spool 54 by line 74. This maintains a pressure differential between system output line 60 and second pump outlet 44 equal to the force of the spring 72.

The position of the second spool 54 also places the second metering window 64 in fluid communication with first pump outlet port 56 and first metering window 62 in fluid communication first pump input port 50. This places the fluid output of the second pump 14, now present on system output line 60 in fluid communication with cavity 65 and line 28. However, check valve 18 is closed which prevents back flow through the non-operating first pump 12. Therefore the output of the system 10 is provided by the operating second pump 14 without back flow through the non-operational first pump 12.

Figure 3:
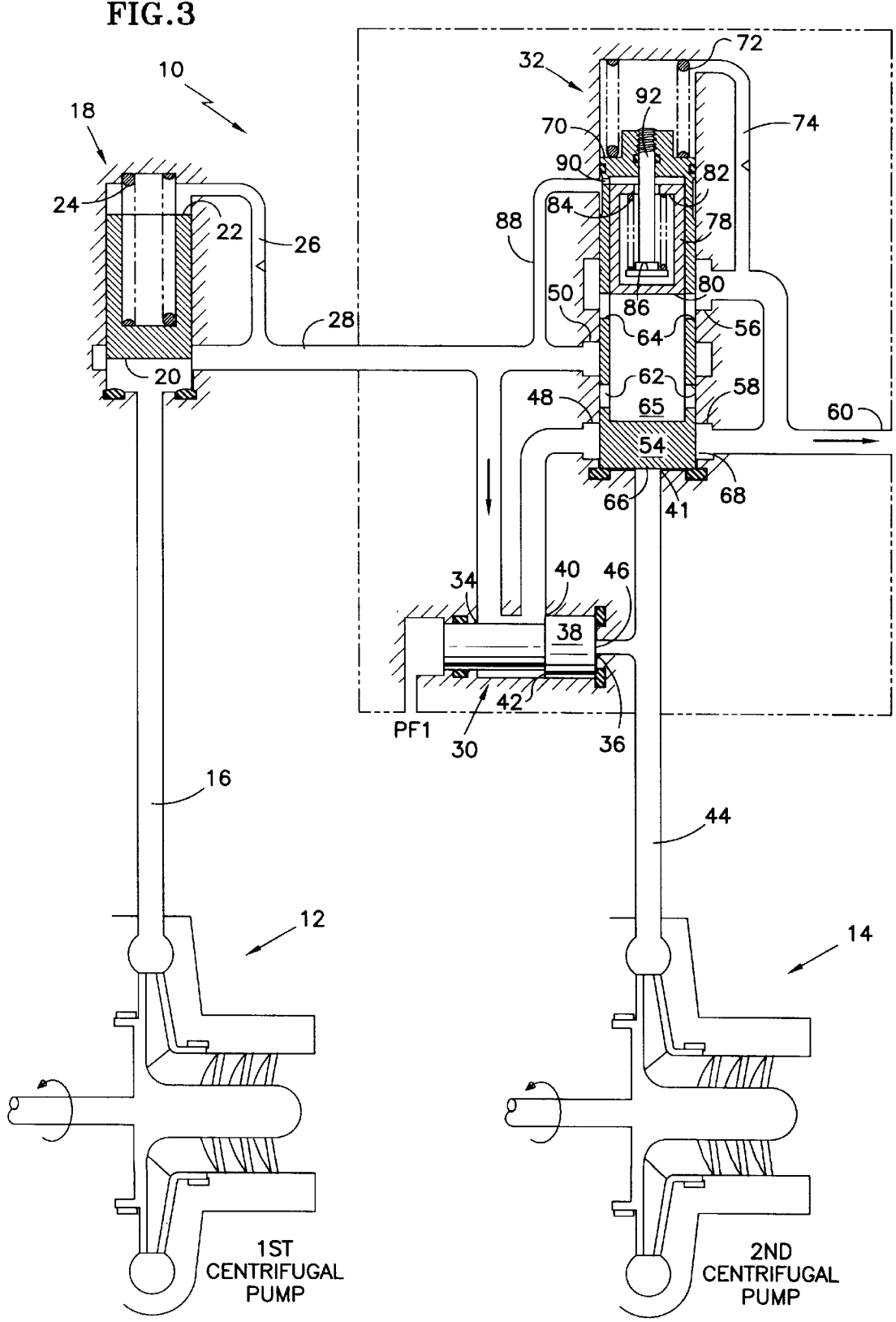
FIG. 3 is a schematic view of the load sharing system with only the first pump supplying flow.

FIG. 3 illustrates operation of the system 10 when the first pump 12 is operational and the second pump 14 is non-operational. First pump 12 provides an output at first pump outlet 16 which is in fluid communication with first end 20 of check valve 18. The pressure at first end 20 causes spring 24 at second end 22 to compress, opening check valve 18, and placing first pump outlet 16 in fluid communication with line 28.

Line 26 provides pressure feedback from line 28 to second end 22 of check valve 18. This ensures that check valve 18 will maintain a pressure differential between line 28 and first pump outlet 16 equal to the force of spring 24.

Line 28 is in fluid communication with first pump input port 50 of the load sharing valve 32 and first pump input port 34 of the sensing valve 30. The pressure supplied by first pump 12 is therefore present at first end 42 of spool 38 of the sensing valve 30. Second pump 14 is non-operational and therefore the pressure in second pump outlet 44 which is in fluid communication with second end 46 of spool 38 is less than the pressure at first end 42. Therefore spool 38 transitions to the right placing first pump input port 34 in fluid communication with output port 40 which is in turn in fluid communication with bypass input port 48.

As stated previously, second pump 14 is non-operational and therefore the pressure at first end 66 of the second pump spool 54 of the load sharing valve 32 is less than the force exerted by the spring 72 upon second end 70 of the second pump spool 54. Therefore the second pump spool 54 transitions toward second pump input port 41, preventing fluid communication between second pump input port 41 and second pump/bypass output port 58. This prevents back flow through the non-operational second pump 14.

Bypass input port 48 is in fluid communication with second pump/bypass output port 58 through an annular passageway around valve spool 54. Therefore the output of first pump 12 is provided at system output line 60.

In accordance with the apparatus and method described above a load sharing valve and system for operating centrifugal pumps in parallel invention is provided which allows for operation of centrifugal pumps in parallel. The subject invention further provides a load sharing valve that allows for simultaneous operation of centrifugal pumps in parallel. The subject invention further provides for simultaneous operation of pumps in parallel and prevents back flow through a parallel non-operational pump.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A load sharing valve system, including an outlet, for operating a first pump in parallel with a second pump to provide a flow of fluid comprising:

a first input in fluid communication with said first pump;

a second input in fluid communication with said second pump;

a second spool;

a first spool disposed within said second spool wherein said second spool and said first spool are positioned in response to said flow and operation of said first and said second pumps;

a first end of said second spool defining a second pump window having an area disposed between said second input and said outlet;

a cavity disposed within said second spool;

a first metering window having a first area for providing fluid communication between said first input and said cavity;

a second metering window having a second area for providing fluid communication between said cavity and the outlet;

a second end of said second spool; and, a second positioning means, located at said second end for positioning said second spool for determining said area of said second pump window and said first area of said first metering window.

2. The load sharing valve system of claim 1 wherein said first spool comprises:

a first end;

a second end; and, a first positioning means for positioning said first spool determining said second area of said second metering window.

3. The load sharing valve system of claim 2 wherein said first area is approximately equal to said area and said first positioning means is approximately equal to said second positioning means for providing a first portion equal to said second portion.

4. The load sharing valve system of claim 2 wherein said first positioning means comprises a first spring.

5. The load sharing valve system of claim 1 wherein said second positioning means comprises a second spring.

6. A system, including a system outlet, for operating a first pump in parallel with a second pump to provide a flow of fluid comprising:

a check valve means in fluid communication with said first pump for preventing flow through said first pump when said first pump is not operating;

a sensing valve means in fluid communication with said check valve means and said second pump and including a sensing valve outlet for placing the check valve means in fluid communication with said sensing valve outlet when said second pump is not operating;

a load sharing valve means in fluid communication with said check valve means, said sensing valve outlet and said second pump for controlling said flow wherein said flow comprises a first portion of flow provided by said first pump and a second portion of flow provided by said second pump when said first and said second pumps are operating, wherein said flow comprises said first portion when said second pump is not operating, and wherein said flow comprises said second portion when said first pump is not operating;

a second spool;

a first spool disposed within said second spool wherein said second spool and said first spool are positioned in response to said flow and operation of said first and said second pumps;

a first end of said second spool defining a second pump window having an area disposed between said second pump and said system outlet;

a cavity disposed within said second spool;

a first metering window having a first area for providing fluid communication between said first pump and said cavity;

a second metering window having a second area for providing fluid communication between said cavity and the system outlet;

a second end of said second spool; and, a second positioning means, located at said second end for positioning said second spool for determining said area of said second pump window and said first area of said first metering window.

7. The system of claim 6, wherein said first spool comprises:

a first end;

a second end; and, a first positioning means for positioning said first spool determining said second area of said second metering window.

8. The system of claim 7 wherein said first area is approximately equal to said area and said first positioning means is approximately equal to said second positioning means for providing a first portion equal to said second portion.

9. The system of claim 7 wherein said second spool further comprises a bypass means for providing fluid communication between said sensing valve outlet and said system outlet when said second pump is not operational.

10. The system of claim 7 wherein said first positioning means comprises a first spring.

11. The system of claim 6 wherein said second positioning means comprises a second spring.

* * * * *